May 28, 1935. H. P. HANSEN Re. 19,593

MORTUARY RECORD CONTAINER

Original Filed March 30, 1931 2 Sheets-Sheet 1

INVENTOR
H. P. Hansen

BY
Denison & Thompson
ATTORNEYS

WITNESS
J. T. Mains

May 28, 1935. H. P. HANSEN Re. 19,593

MORTUARY RECORD CONTAINER

Original Filed March 30, 1931 2 Sheets-Sheet 2

INVENTOR
H. P. Hansen

WITNESS
J. J. Mains

BY
Denison & Thompson
ATTORNEYS

Reissued May 28, 1935

Re. 19,593

UNITED STATES PATENT OFFICE 19,593

MORTUARY RECORD CONTAINER

Hans P. Hansen, Syracuse, N. Y.

Original No. 1,900,708, dated March 7, 1933, Serial No. 526,307, March 30, 1931. Application for reissue July 12, 1933, Serial No. 680,060

3 Claims. (Cl. 40—19)

This invention relates to a mortuary record outfit or equipment involving the use of a holder or container of the class set forth in my Patent No. 1,785,582, December 16, 1930, and a suitable support for the container adapted to be placed within the burial casket of the deceased individual so that the records enclosed within or placed upon the container may be preserved for future identification of the deceased in case the remains may be disinterred or removed.

The main object is to provide this equipment as a new article of manufacture to be displayed and purchased for use with the burial casket for the deceased so that a brief history of, or other informative matter relating to the life of the deceased may be permanently written or otherwise indited upon a parchment or equivalent scroll to be inserted into the container, and the latter hermetically sealed preparatory to installation within some part of the burial casket.

One of the specific objects is to provide means whereby a suitable plate or plates bearing the name or other informative matter relating to the deceased may be placed and permanently retained upon one or more portions of the container in such manner that they may be readily visible from the exterior thereof without removing any of the sectional parts of the container.

Other objects and uses relating to specific parts of the equipment will be brought out in the following description.

In the drawings:—

Figure 6:
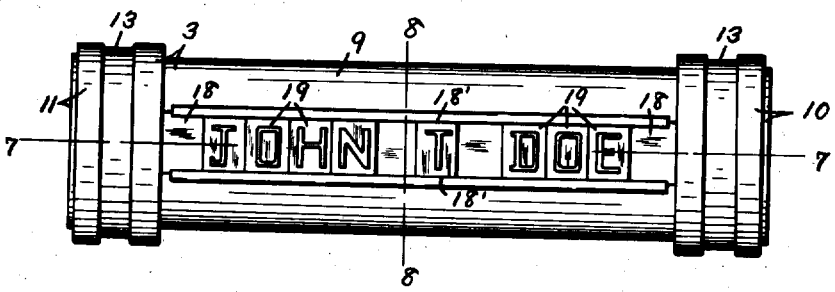
Figure 6 is a face view of a slightly modified form of container in which the letter plates are mounted upon a bar which is held in place by the end caps of the container.
Figure 7:
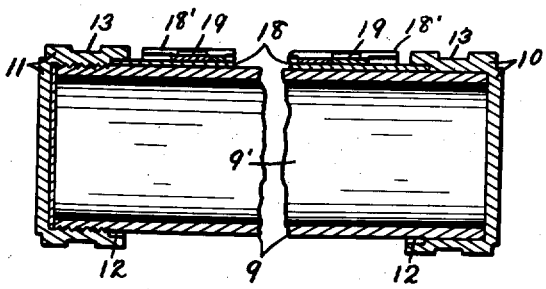
Figure 8:
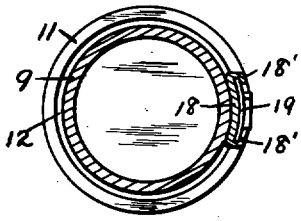

Figures 7 and 8 are respectively a longitudinal sectional view, partly broken away, taken in the plane of line 7—7, and a transverse section taken on line 8—8, Figure 6.

Figure 9 is a perspective view of one of the detached plate-supporting bars shown in Figure 6.

Figure 10 is a perspective view of one of the detached letter plates adapted to be used with the bar shown in Figure 9.

Figure 11 is a longitudinal sectional view, partly broken away, of the scroll container similar to that shown in Figure 6, illustrating a modified form of plate-supporting bar and letter plates thereon.

Figure 12 is an enlarged detail transverse sectional view taken in the plane of line 12—12, Figure 11.

Figure 13 is a perspective view of the detached plate-supporting bar shown in Figure 11.

Figure 14 is a perspective view of one of the detached letter plates shown in Figure 11.

Figure 15 is a perspective view of a fragmentary portion of another modified container with a correspondingly modified form of letter-plate used therewith.

Figure 16 is an end-view of a modified support for the container.

Figure 1:
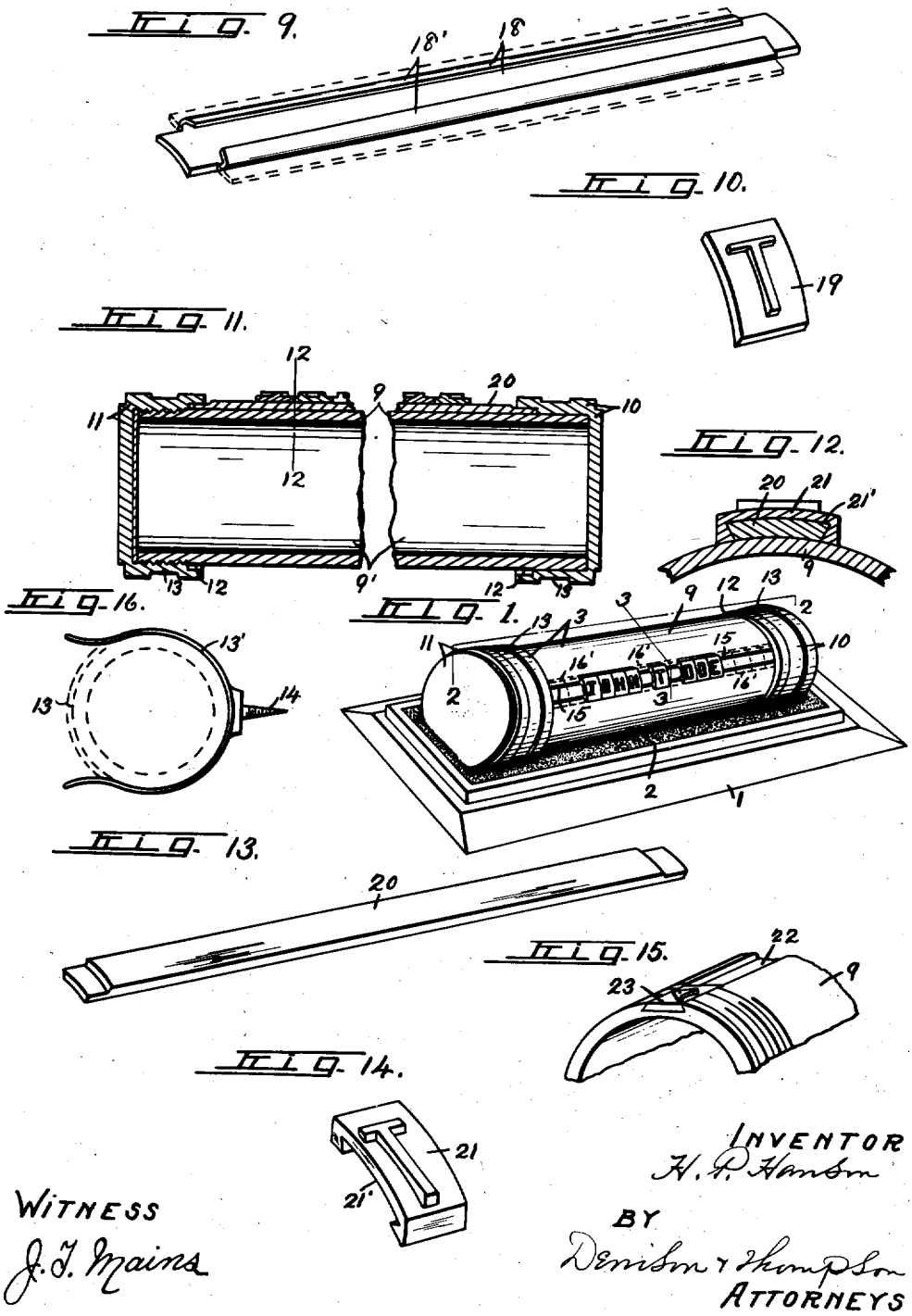
Figure 1 is a perspective view of a complete outfit ready for display or use, in which the container for the scroll and other appurtenances for filling out the scroll and sealing the container are mounted upon a suitable supporting base.
Figure 2:
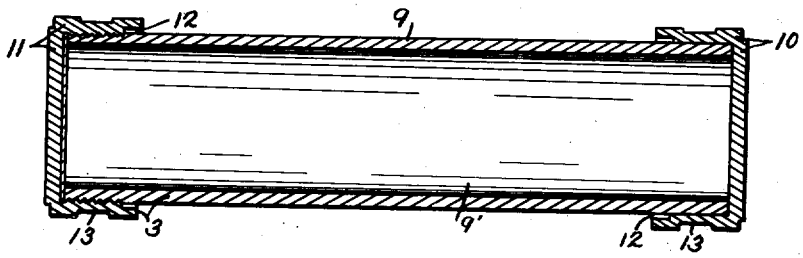
Figure 2 is a longitudinal sectional view of the detached container, taken on the plane of line 2—2, Figure 1, omitting the contents furnished therein.

This mortuary record outfit, as shown in Figure 1, comprises a supporting base 1 of any suitable construction, (preferably ornamental) having a recess 2 in its upper side for receiving and retaining a cylindrical container 3 which is adapted to receive one or more scrolls and other articles or records, not shown.

The base 1 may be made of wood, metal or any other suitable material of somewhat greater length and width than the length and width of the container 3, the recess 2 in the upper face of the base being concaved in cross section and covered with a pad or upholstering of any suitable material capable of conforming to the contour of the adjacent portion of the container 3 resting thereon.

The length of the recess 2 is substantially equal to the length of the container 3 so that when the latter is placed therein the end walls of the recess will hold the container against relative endwise movement therein.

In like manner, the side walls of the recess serve to hold the container against lateral displacement from the base, although it is to be understood that the container may be removed and replaced from and within the recess whenever desired.

The container comprises a main tubular cylindrical section 9 and opposite end cap sections 10 and 11 of imperforate non-corrodible metal, the tubular section 9 being preferably made of non-corrodible metal or other strong durable material, and is provided with a cylindrical bore or opening 9' extending therethrough from end to end, as shown more clearly in Figure 7.

One of the cap sections, as 10, is tightly fitted over and upon the periphery of the corresponding end of the tubular section 9 to form a liquid and gas-tight joint therewith but may be detached therefrom, the outer end of the cap section being closed for the same purpose and to assist in concealing the contents of the container 2.

The opposite end of the tube 9 is threaded externally, while the cap section 11 is threaded internally and screwed tightly upon the adjacent end of the tube 9 for axial adjustment, and also has its outer end closed to cooperate with the threaded joint to hermetically seal that end of the container.

Aside from the threading of the cap 11, it is quite similar to the cap 10 in that the inner ends of both caps extend beyond their areas of contact with the adjacent ends of the tube 9, and are provided with annular grooves or recesses 12 for receiving the adjacent ends of name-plate-supporting bars, presently described, and also for receiving a suitable sealing material.

This sealing material is applied to or inserted in the annular grooves 12 while in a more or less plastic state and is capable of hardening when exposed to air for hermetically sealing the joints between the cap sections and adjacent ends of the tube 9.

The end caps are also provided with annular peripheral grooves 13 substantially midway between the ends thereof for receiving the opposite arms of spring clasps 13', one of which is shown in Figure 16, as provided with a screw 14 by which the clasp may be secured to the bottom of the recess 2 in the base 1, or to any other suitable support for holding the container 3 in proper position for display or in a definite position within a burial casket.

Figure 3:
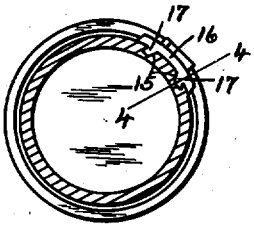
Figure 3 is a transverse sectional view taken in the plane of line 3—3, Figure 1, except that the contents of the container are omitted.
Figure 4:
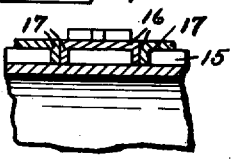
Figure 4 is a detail sectional view of a portion of the container taken in the plane of line 4—4, Figure 3, showing the manner of assembling the letter plates thereon.
Figure 5:
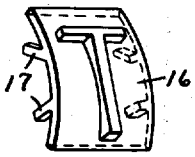
Figure 5 is a perspective view of one of the detached letter plates.

The periphery of the tubular section 9 of the container 3, shown in Figures 1 and 3 is provided with a pair of lengthwise guide grooves 15 extending the entire distance between the inner ends of the cap sections 10 and 11 and preferably from end to end of the tubular section to form a guide for receiving and retaining a series of letter plates 16 which are arranged to form the name of, or other informative matter relating to the deceased.

As shown more clearly in Figures 1 and 3, the guide consists of a pair of lengthwise parallel grooves 15 having at least their outer walls undercut or beveled in cross section while each of the plates 16 is provided on its inner face with one or more, in this instance two, lengthwise ribs or flanges 17 having at least their outer longitudinal edges similarly undercut in cross section to correspond to the grooves of the guide 15.

When the plates are placed one by one in sequence within the guide 15 from one end thereof, they will be self-retaining against radial displacement from the container, particularly when both of the end caps 10 and 11 are secured in place, it being understood that the spaces between the words and initials, and also the spaces between the end plates and end caps, may be filled in with blank plates 16', if desired, to hold the lettered plates, in proper relation to each other, the blank plates 16' being indicated by dotted lines in Figure 1.

If the length of the combined plates in the guide 15 exceeds the distance between the inner ends of the cap sections 10 and 11, the outer ends of the end plates may be inserted into the grooves 12 to assist in retaining those plates in operative position against radial displacement, and at the same time holding the entire series of plates against endwise movement on the container.

In Figures 6 to 10 inclusive is shown a modified form of type-plate-guide consisting of a lengthwise type-supporting bar 18 applied to the periphery of the tubular section 9 to extend lengthwise thereof a distance somewhat greater than that between the inner ends of the cap sections 10 and 11 and having its opposite ends inserted in the annular grooves 12 in the adjacent cap sections for holding the guide bar 18 against radial displacement and also against undue lengthwise movement relatively to the container 3.

The guide bar 18 is provided along its opposite longitudinal edges with out-turned parallel flanges 18' having inner lengthwise grooves for retaining a number of letter plates 19 having their opposite longitudinal edges engaged in the grooves of the flanges 18' for holding them in operative position on the bar 18 against radial or lateral displacement.

These flanges 18' terminate slightly short of the inner ends of the cap sections 10 and 11, and the intervening space between the flanges is open at the ends to allow the letter plates 19 to be inserted from either end of the bar, which latter, it will be understood, is made separate from the tubular section 9 so that the letter plates may be placed thereon before the bar 18 is placed in operative position on the periphery of the container with its ends in the grooves 12 of the cap sections 10 and 11.

The modified plate-supporting bar, as 20, shown in Figures 11, 12 and 13, is somewhat similar to the bar 18 except that the flanges 18' are omitted and the opposite longitudinal edges of the bar are undercut in cross section to receive and retain a series of letter-plates 21 having lengthwise grooves 21' in their inner sides, complementary to the cross section of the bar 20 and adapted to be placed sequentially upon the bar from one end thereof.

In the modification shown in Figure 15, the periphery of the tubular section 1 of the container is provided with one or more lengthwise grooves 22 extending lengthwise thereof from end to end and dovetailed in cross section for receiving a series of letter plates 23 of complementary cross sectional form adapted to be placed successively in the groove from one end of the tubular section 9 for self-retention against radial displacement, in which case the outer surfaces of the plates 23 will be substantially co-incident with the periphery of the tubular section 9.

It is, of course, understood that the outer ends of the end plates 23 may, if desired, extend into the annular grooves 12 of the corresponding cap sections 10 and 11, and that suitable blank spacing plates may be interposed between the letter plates, if desired, to hold the latter against endwise movement relatively to the tubular section of the container.

*Operation*

When making up this mortuary record kit as a new article of manufacture for sale or display, one of the end caps as 10 may be permanently secured and sealed to the corresponding end of the tubular section 9 and, before the other cap section, as 11, is placed in operative position upon the corresponding end of the tubular section 9, the records to be protected will be placed within the tubular section 9.

The letter plates 16 or 23, or the bars 18 or 20, with the letter plates thereon, will then be placed in operative position upon the periphery of the tubular section 9 of the container, after which the cap section 11 will be firmly screwed upon the adjacent end of the tubular section 9, it being understood that when both cap sections are placed in operative position and either of the plate supporting bars 18 or 20 is used, the ends of the bar will enter the grooves 12 in the corresponding cap sections 10 and 11 to hold the bar against radial displacement and also axial movement, and, if desired, the outer ends of the latter plates or their spacing blanks may enter the grooves 12.

The container 3 with the records therein may then be placed in the recess 2 of the base 1 for sale or display, or the same container may be placed in a pair of spring-supporting clasps as 13' for display or sale instead of mounting the container upon the base 1, in which case the spring clasps 13' might be supported upon a board or wall with the arms of the clasp engaging in the grooves 13 of the container.

When the container is sold to be installed in a burial casket, the cap section 11 will be removed to permit the records to be filled out and reinserted in the tubular section.

After the records have been properly filled out, they are placed within the tubular section 9 of the container through the open end thereof, the letter plates or bars bearing the same with the letters arranged in proper order for the external record desired being then placed in operative position upon the periphery of the tubular section 9 followed by screwing the cap 11 tightly upon the adjacent end of the tube in the manner previously described.

The plastic sealing material is then worked into the annular grooves 12 around the adjacent portions of the tubular section 9 and corresponding portions of the letter plates or their supporting bars for hermetically and permanently sealing the joints against the entrance of external fluids or gases.

The container 3 threaded in the manner just described for final use may then be placed in and upon its supporting base 1 and both then placed in the casket with the deceased.

Or, if desired, a pair of clasps 13' may be used in place of the base 1 and secured to the bottom or side walls of the interior of the casket for receiving and supporting the sealing container 3, thus completing the operation and method of use of the mortuary record outfit.

It is to be understood, however, that various changes may be made in the detail construction without departing from the spirit of the invention.

What I claim is:—

1. In a mortuary record holder, the combination of a tubular section, cap-sections fitted over and upon both ends of the tubular section and having their inner ends extended beyond their areas of contact with the tubular section and in spaced relation thereto to form annular grooves, and a sealing material inserted in said grooves for hermetically sealing the joints.

2. In a mortuary record holder the combination of a tubular section, cap sections fitted over and upon both ends of the tubular section and having their inner ends extended beyond the areas of contact with the tubular section and in spaced relation thereto to form annular grooves, said tubular section being provided upon its outer surface with a pair of lengthwise guide grooves undercut transversely, and type plates engaging in said grooves and slidable lengthwise thereof.

3. A mortuary record container comprising in combination a tubular case member, imperforate caps associated with both ends of the tubular member, each of said caps being provided with an annular groove adjacent the tubular member, record means removably mounted on the exterior of the tubular member and projecting into said grooves, at least one of said caps being adjustable axially on the tubular member for movement into holding engagement with the record means, and a sealing material inserted in the groove of said adjustable cap for hermetically sealing the joint.

HANS P. HANSEN.